(12) United States Patent
Brass et al.

(10) Patent No.: US 7,460,875 B2
(45) Date of Patent: Dec. 2, 2008

(54) ADDITIONAL INFORMATION FOR VOICE GROUP CALL SERVICE

(75) Inventors: Volker Brass, Bonn (DE); Walter Grethe, Köln (DE); Thomas Sieredzki, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/580,093

(22) PCT Filed: Nov. 19, 2004

(86) PCT No.: PCT/EP2004/013159

§ 371 (c)(1),
(2), (4) Date: Jan. 8, 2007

(87) PCT Pub. No.: WO2005/055632

PCT Pub. Date: Jun. 16, 2005

(65) Prior Publication Data

US 2007/0224974 A1  Sep. 27, 2007

(30) Foreign Application Priority Data

Nov. 21, 2003  (EP) .................................. 03026786

(51) Int. Cl.
*H04B 7/00* (2006.01)

(52) U.S. Cl. .................... 455/518; 455/519; 455/412.1; 455/412.2

(58) Field of Classification Search ......... 455/518–519, 455/414.1, 517, 415, 416, 433, 435.1, 41.2, 455/428, 450, 466; 370/401, 352, 31, 337, 370/341, 328
See application file for complete search history.

(56) References Cited

U.S. PATENT DOCUMENTS

| | | | | |
|---|---|---|---|---|
| 5,506,837 A * | 4/1996 | Sollner et al. | ............... | 370/296 |
| 6,385,461 B1 * | 5/2002 | Raith | ......................... | 455/518 |
| 6,405,050 B1 * | 6/2002 | Amirijoo et al. | ............ | 455/518 |
| 6,545,995 B1 * | 4/2003 | Kinnunen et al. | ........... | 370/341 |
| 6,725,052 B1 * | 4/2004 | Raith | ......................... | 455/518 |
| 7,170,863 B1 * | 1/2007 | Denman et al. | ............. | 370/260 |
| 2003/0016632 A1 * | 1/2003 | Refai et al. | .................. | 370/260 |
| 2003/0087647 A1 * | 5/2003 | Hurst | ......................... | 455/456 |
| 2003/0100326 A1 * | 5/2003 | Grube et al. | ................. | 455/515 |
| 2004/0185855 A1 * | 9/2004 | Storm et al. | ................. | 455/445 |
| 2005/0239485 A1 * | 10/2005 | Kundu et al. | ................ | 455/519 |
| 2006/0209788 A1 * | 9/2006 | Boldt et al. | .................. | 370/352 |
| 2007/0105569 A1 * | 5/2007 | Brass et al. | .................. | 455/466 |
| 2007/0232312 A1 * | 10/2007 | Gallagher et al. | ........... | 455/436 |
| 2008/0108333 A1 * | 5/2008 | Jemison et al. | ........... | 455/414.1 |

OTHER PUBLICATIONS

"Digital cellular telecommunications system (Phase 2+); Voice Group Call Service (VGCS); Stage 2 (3GPP TS 43.068 version 5.2.0 Release 5; ETSI TS 143 068" ETSI Standards, European Telecommunications Standards Institute, Sophia-Antipo, FR, vol. 3-CN1, No. V520, pp. 1-69 (Dec. 2002).

"PCT International Search Report" International Application No. PCT/EP2004/013159, filed Nov. 19, 2004.

* cited by examiner

*Primary Examiner*—Tan Trinh
(74) *Attorney, Agent, or Firm*—The Maxham Firm

(57) ABSTRACT

A method and system for providing the active members of a Voice Group Call Service with additional information. The additional information is transmitted in a message on the associated control channel for the downlink traffic channel of the voice group. The additional information is transmitted simultaneously to an ongoing voice group call.

16 Claims, 2 Drawing Sheets

ADDITIONAL INFORMATION FOR VOICE GROUP CALL SERVICE

BACKGROUND

1. Field of the Invention

The present invention generally relates to the field of voice group services in mobile communication networks, and in particular to Voice Group Call Services (VGCS).

2. Discussion of Prior Art

Voice Group Call Service allows the establishment of a call between members of a group in numerous cells of the mobile telecommunication network simultaneously. These cells define the service area. All subscribers belonging to the group have the possibility to listen to the call in the service area. It is also possible to participate in the call individually. Service subscribers of the radio network can become group members on a network-wide basis to one or more groups pre-defined in the network by a corresponding group identification (group ID). The membership enables them to receive voice group calls associated with that group ID.

In addition, certain group members are entitled by their subscription to initiate Voice Group Calls (VGC). In addition to subscriber details in the Home Location Register (HLR), it is necessary for the mobile station (MS) to be aware of its group membership by storing details on the Subscriber Identity Module (SIM). This is required because it responds to notification messages which include only the group call relevant information, that is, no IMSI or TMSI details. Having become a group member, each service subscriber can set to active state or deactive state the group ID or any one out of his several group IDs on the SIM. In active state the subscriber can initiate VGCs to that group ID. When in deactive state the subscriber cannot make VGCs to the group and the mobile station ignores any notification for that group ID.

A group call area can be restricted to a single Mobile Switching Center (MSC) area or can exceed one MSC area (implementation option). A voice group call is initiated by a calling subscriber by a related man machine interface action for the service selection and the group ID dialed. The MSC in which the voice group call is initiated obtains by requesting a Group Call Register (GCR) the group call attributes. The GCR is functionality in the network containing the group call attributes. This GCR interrogation after call initiation also determines whether the MSC acts as group call Anchor- or as group call Relay-MSC. A group call Anchor-MSC is responsible for managing and maintaining a particular VGC. The group call Anchor-MSC is determined as the one controlling the cells of the group call area. For VGCSs where the group call area exceeds an MSC area, the group call Anchor-MSC is predefined in the network. A group call Relay-MSC controls cells of a group call area which are not under control of the group call Anchor-MSC for those voice group call services where the group call area exceeds one MSC area.

If the MSC is not the Anchor-MSC then the call will be "forwarded" from the Relay-MSC to the respective Anchor-MSC (information also delivered by GCR) and further "call-establishment" is done by the Anchor-MSC.

When a calling subscriber (talker) initiates a voice group call, one voice group call channel is established in each cell of the group call area and notifications for that call is sent in each of these cells. A voice group call channel is a downlink to be allocated in each cell of the group call area for a particular voice group call. All mobile stations being service subscribers for that Voice Group Call in one cell listens to the common downlink. All mobile stations of the listening service subscribers in one cell only listens to the same common downlink (voice group call channel). Of course it is possible to change the talker at any time, so that one of the listeners of the group becomes the talker and the previous talker becomes a listener.

The standards of Voice Group Call Service are specified in the technical specification ETSI TS 143 068, V5.2.0, December 2002: Digital Cellular telecommunication system (Phase 2+); Voice Group Call Service (VGCS); Stage 2; 3GPP TS 43.068 version 5.2.0 Rel. 5.

US patent publication 2003/0100326 A1 relates to a group location and route sharing system for communication units in a trunked communication system, wherein the communication units are engaged in a group voice call communication. Subscription and location data can be sent as a supplementary information to the group voice call communication by using an underlying packet transport layer.

SUMMARY OF THE INVENTION

It is a purpose of the invention to enhance the conventional voice group call service by providing an additional communication service without changing the general architecture of the communication network.

The additional information for Voice Group Call Service (VGCS) is designed to provide all active members of a VGCS in parallel, that is, simultaneous to an ongoing voice group call, with additional information, for example, the tactical addresses of the current talker. The information contained here may have a text-oriented or binary-oriented character.

The transmission of the additional information shall be realized only in acknowledged mode and is sent on the Slow Associated Control Channel (SACCH), which represents an associated control channel for the downlink traffic channel of the voice group call.

BRIEF DESCRIPTION OF THE DRAWING

The objects, advantages and features of the invention will be more clearly perceived from the following detailed description, when read in conjunction with the accompanying drawing, wherein.

DETAILED DESCRIPTION OF THE PREFERRED EMBODIMENTS

Figure 1:
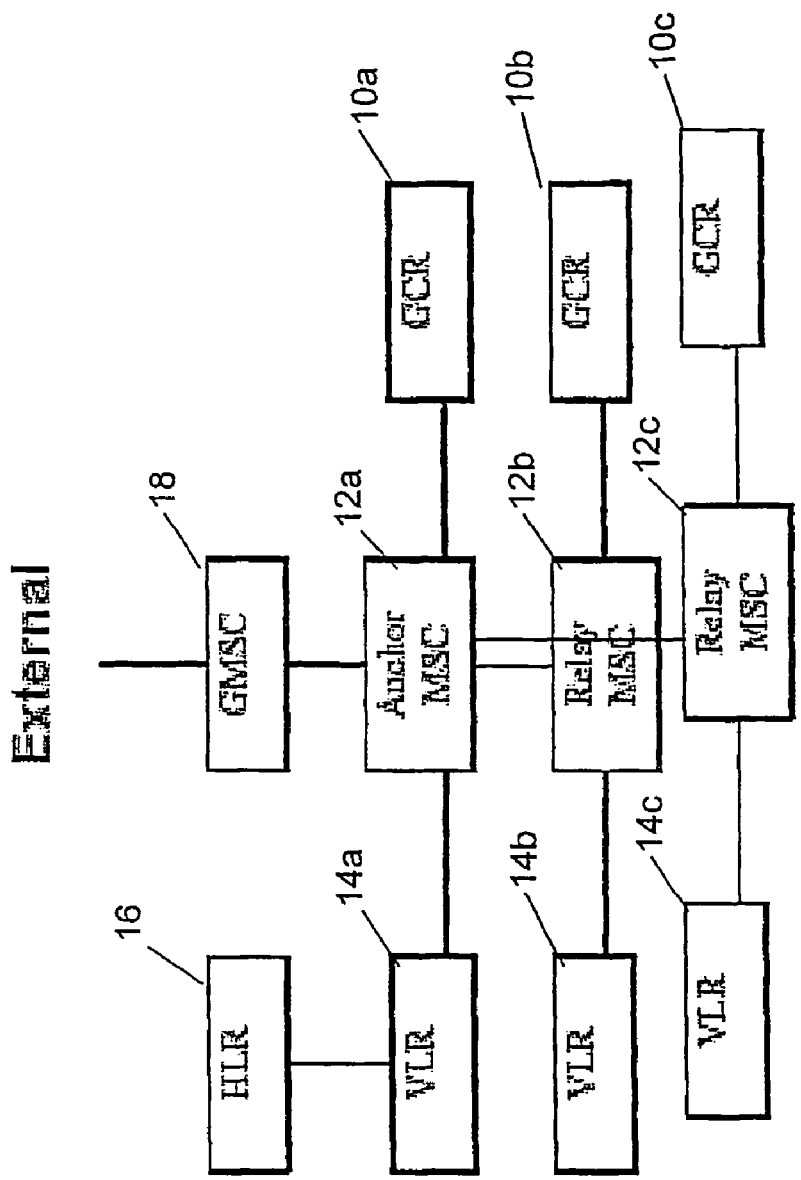
FIG. 1 shows a functional voice group call architecture with a group call register.

The general architecture of GSM is maintained in this invention. With reference to FIG. 1, in addition, a network function is required which is used for registration of the group call attributes, the group call register (GCR) 10a, 10b, 10c. The GCR function is mainly a database function, holding information about voice group calls. The signalling between the entities shown in FIG. 1 shall be as defined in the following.

The Mobile Switching Center (MSC) 12a, 12b, 12c containing the cell within which this voice group call is initiated performs subscription checking against Visitor, Location Register (VLR) 14a, 14b, 14c and Home Location Register 16 records. It then consults its GCR 10a, 10b, 10c, respectively, to determine the group call attributes related to its MSC area and whether it is the group call Anchor-MSC 12a for that voice group call. If it is not, the GCR provides with the group call reference and the routing information identifying the group call Anchor-MSC 12a to the originating MSC. The originating MSC then routes the voice group call to the Anchor-MSC 12a. If the originating MSC is the group call Anchor-MSC 12a, along with the group call attributes, the respective GCR 10a provides information on all group call Relay-MSCs 12b, 12c to be involved. The group call Anchor-MSC 12a sets up links to all group call Relay-MSCs 12b, 12c. Each MSC 12a, 12b, 12c involved in a voice group call obtains its proper group call attributes from the GCR 10a, 10b, 10c related to the respective MSC.

The GCR 10a, 10b, 10c holds for a related MSC area for each group ID and cells from which voice group calls can be established by service subscribers, the group call reference to be used for a voice group call to be established and an indication whether the originating MSC is the group call Anchor-MSC 12a. If the originating MSC is the group call Anchor-MSC 12a, the GCR 10a provides the group call attributes related to that group call reference to the originating MSC and the originating MSC establishes the voice group call. If the originating MSC is not the Anchor-MSC 12a, the GCR 10a provides the group call reference plus the routing information identifying the Anchor-MSC 12a to the originating MSC and the originating MSC routes the voice group call to the Anchor-MSC 12a.

According to the invention, an additional information can be forwarded to all group members during an ongoing voice group call. This is preferably done by transmitting a message containing the additional information on the associated control channel for the traffic channel of the voice group.

Figure 2:
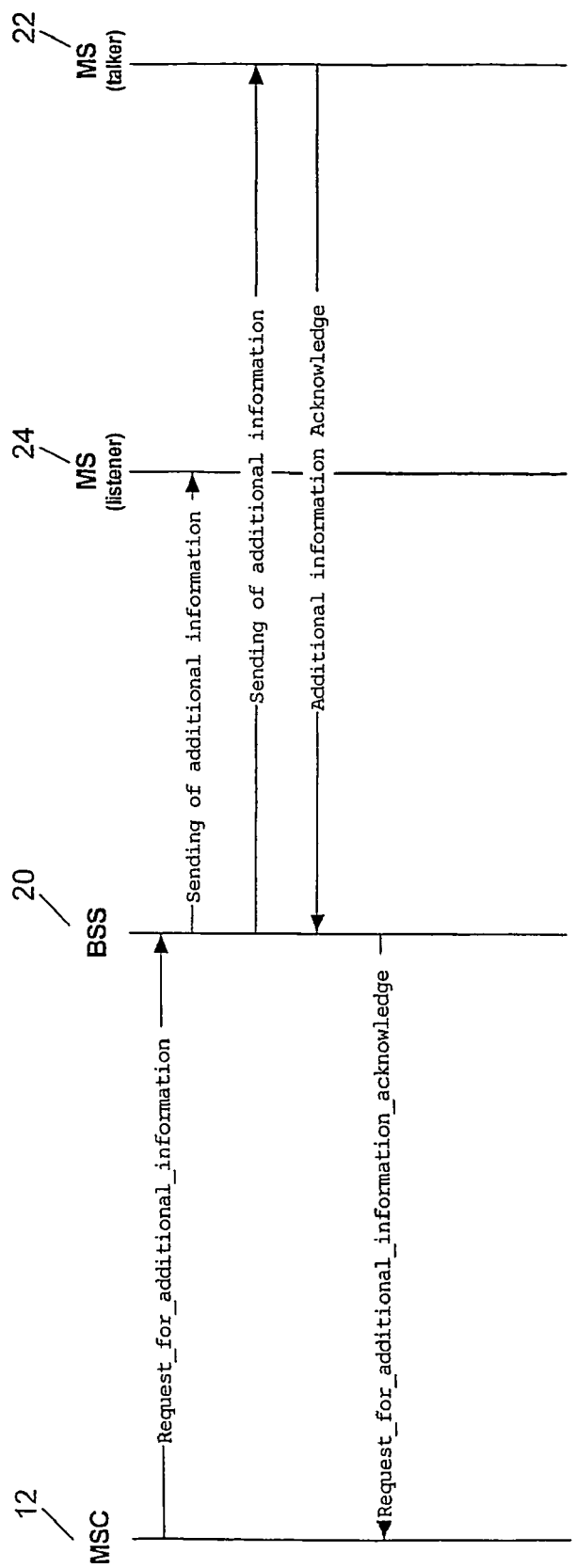
FIG. 2 shows a transfer of additional information to members of a VGCS.

Referring now to FIG. 2, the MSC 12 (either Anchor- or Relay-MSC) triggers via an appropriate message, for example, an additional-information-request-message, on the A-interface the base station subsystem (BSS) 20 to send the additional information to the mobile stations MS 22, 24 of the group members, that is, one talker 22 and at least one listener 24. The message contains at least the additional information itself. The VGC-ID or VGC-Reference represents an optional part of this message.

In the case where the message is sent on the controlling SCCP-connection (Signaling Connection Control Part connection) of the VGC, the addressing which VGC is meant is not necessary.

In addition to this, the message, that is, the additional-information-request-message, can be sent on the resource controlling SCCP-connections.

Afterwards, the BSS 20 transmits the additional information on the SACCH of all TCHs where the VGC is ongoing, so that the additional information can be received by all MS 22, 24 participating in the voice group. The provisioning of the additional information in radio cells which are belonging the VGC-area but in which a VGC-channel is not established is not necessary.

In the case that the additional information is sent on the controlling SCCP-connection, the BSS 20 is responsible to transmit the additional information on all SACCHs for this VGC.

After having sent the additional information, the BSS 20 provides an acknowledge information to the MSC 12 that the additional information was sent to the mobile stations 22, 24. However, this acknowledge information does not confirm to the sender of the message that the individual members of a voice group call have received the message.

In order to give an indication that the additional information was at least received by the current talker 22, the talker 22 may send an acknowledgement on the Uplink-SACCH for this VGC.

LIST OF REFERENCE NUMERALS AND ABBREVIATIONS

| | |
|---|---|
| 10a, 10b, 10c | Group Call Register |
| 12a, 12b, 12c | Mobile Switching Center |
| 14a, 14b, 14c | Visitor Location Register |
| 16 | Home Location Register |
| 18 | Gateway Mobile Switching Center |
| 20 | Base Station Subsystem |
| 22 | MS (Talker) |
| 24 | MS (Listener) |
| BSS | Base Station Subsystem |
| MS | Mobile Station |
| MSC | Mobile Switching Centre |
| SACCH | Slow Associated Control Channel |
| SCCP | Signaling Connection Control Part |
| TCH | Traffic Channel |
| VGC | Voice Group Call |
| VGCS | Voice Group Call Service |

The invention claimed is:

1. A method for providing active members of a Voice Group Call Service (VGCS) with additional information, the method comprising:

transmitting the additional information in a message on an associated control channel for a traffic channel of the voice group, wherein the message contains a voice group call ID (VGC-ID) or a voice group call Reference (VGC reference);

triggering, via a mobile switching center (MSC), a message, addition-information-request-message, on an A-interface a base station subsystem (BSS), to send the additional information to the group members; and sending, via the BSS the additional information on a slow associated control channel (SACCH) of all traffic channels (TCHs) where the VGC is ongoing.

2. The method according to claim 1, wherein the message is sent on a resource controlling signaling connection control part (SCCP) connection.

3. The method according to claim 2, wherein the additional information is not provided in radio cells which belong to the VGC-area but a VGC-channel is not established.

4. The method according to claim 2, wherein the additional information is sent on a controlling signaling connection control part (SCCP) connection, wherein the BSS is responsible for sending the additional information on all SACCHs for this VGC.

5. The method according to claim 2, wherein after having sent the additional information, the BSS provides an acknowledge information to the MSC that the additional information was sent to mobile stations (MSs).

6. The method according to claim 2, wherein in order to give an indication that the additional information was at least received by a current talker, said talker sends an acknowledgement on an uplink-SACCH for this VGC.

7. The method according to claim 1, wherein the message is sent on a controlling signaling connection control part (SCCP) connection of the YGC without addressing a meant VGC.

8. The method according to claim 7, wherein the additional information is not provided in radio cells which belong to the VGC-area but a VGC-channel is not established.

9. The method according to claim 7, wherein the additional information is sent on a controlling signaling connection control part (SCCP) connection, wherein the BSS is responsible for sending the additional information on all SACCHs for this VGC.

10. The method according to claim 7, wherein after having sent the additional information, the BSS provides an acknowledge information to the MSC that the additional information was sent to mobile stations (MSs).

11. The method according to claim 7, wherein in order to give an indication that the additional information was at least received by a current talker, said talker sends an acknowledgement on an uplink-SACCH for this VGC.

12. The method according to claim 1, wherein the additional information is not provided in radio cells which belong to the VGC-area but a VGC-channel is not established.

13. The method according to claim 1, wherein the additional information is sent on a controlling signaling connection control part (SCCP) connection, wherein the BSS is responsible for sending the additional information on all SACCHs for this VGC.

14. The method according to claim 1, wherein after having sent the additional information, the BSS provides an acknowledge information to the MSC that the additional information was sent to mobile stations (MSs).

15. The method according to claim 1, wherein in order to give an indication that the additional information was at least received by a current talker, said talker sends an acknowledgement on an uplink-SACCH for this VGC.

16. A system for providing members of a Voice Group Call Service (VGCS) with additional information, the system comprising:
- first signal processing units for dedicated text-and/or binary signal transmission;
- second signal processing units for speech transmission purposes in combination with said first signal processing units;
- the additional information contains a voice group call ID (VGC-ID) or a voice group call Reference (VGC Reference);
- an A-interface;
- a base station subsystem (BSS); and
- a mobile switching center (MSC) connected via said A-interface to said BSS for sending the additional information to the group members via a message, additional-information-request-message; wherein
- the additional information is sent on a slow associated control channel (SACCH) of all traffic channels (TCHs) where the VGC is ongoing.

* * * * *